US010185699B2

(12) United States Patent
Wang et al.

(10) Patent No.: US 10,185,699 B2
(45) Date of Patent: Jan. 22, 2019

(54) RECONFIGURABLE DATA INTERFACE UNIT FOR COMPUTE SYSTEMS

(71) Applicant: Futurewei Technologies, Inc., Plano, TX (US)

(72) Inventors: Qiang Wang, Santa Clara, CA (US); Zhenguo Gu, Plano, TX (US); Qiang Li, Shenzhen (CN); Zhuolei Wang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 151 days.

(21) Appl. No.: 15/069,700

(22) Filed: Mar. 14, 2016

(65) Prior Publication Data

US 2017/0262407 A1 Sep. 14, 2017

(51) Int. Cl.
| | | |
|---|---|---|
| G06F 13/16 | (2006.01) | |
| G06F 15/78 | (2006.01) | |
| G06F 13/42 | (2006.01) | |
| G06F 13/40 | (2006.01) | |

(52) U.S. Cl.
CPC ...... *G06F 15/7871* (2013.01); *G06F 13/1673* (2013.01); *G06F 13/4022* (2013.01); *G06F 13/4282* (2013.01); *G06F 15/7817* (2013.01)

(58) Field of Classification Search
None
See application file for complete search history.

(56) References Cited

U.S. PATENT DOCUMENTS

| | | | |
|---|---|---|---|
| 5,574,930 A | | 11/1996 | Halverson, Jr. et al. |
| 5,583,868 A | * | 12/1996 | Rashid .................... H04L 49/20 |
| | | | 348/E5.008 |
| 5,687,325 A | | 11/1997 | Chang |

(Continued)

FOREIGN PATENT DOCUMENTS

| | | |
|---|---|---|
| CN | 101937415 A | 1/2011 |
| CN | 102073481 A | 5/2011 |
| CN | 105279439 A | 1/2016 |

OTHER PUBLICATIONS

PCT/CN2017/076505, ISR, dated Jun. 14, 2017.
English Abstract of Chinese Publication No. CN102073481 published on May 25, 2011.

*Primary Examiner* — Elias Mamo
(74) *Attorney, Agent, or Firm* — Vierra Magen Marcus LLP

(57) ABSTRACT

A system-on-chip includes a reconfigurable data interface to prepare data streams for execution patterns of a processing unit in a flexible compute accelerate system. An apparatus is provided that includes a first set of line buffers configured to store a plurality of data blocks from a memory of a system-on-chip and a field composition circuit configured to generate a plurality of data segments from each of the data blocks. The field composition circuit is reconfigurable to generate the data segments according to a plurality of reconfiguration schemes. The apparatus includes a second set of line buffers configured to communicate with the field composition circuit to store the plurality of data segments for each data block, and a switching circuit configured to generate from the plurality of data segments a plurality of data streams according to an execution pattern of a processing unit of the system-on-chip.

21 Claims, 6 Drawing Sheets

(56) References Cited

U.S. PATENT DOCUMENTS

| | | | |
|---|---|---|---|
| 5,892,962 A | | 4/1999 | Cloutier |
| 6,070,201 A | * | 5/2000 | Tanaka ................. G06F 3/0626 |
| | | | 710/111 |
| 6,314,490 B1 | * | 11/2001 | Morein ............... G06F 12/0864 |
| | | | 711/129 |
| 6,415,373 B1 | * | 7/2002 | Peters ................. G06F 11/1076 |
| | | | 348/E5.008 |
| 7,225,319 B2 | | 5/2007 | Campi et al. |
| 7,272,613 B2 | * | 9/2007 | Sim ................... G06F 17/30067 |
| | | | 707/999.01 |
| 7,606,943 B2 | * | 10/2009 | Ramchandran ..... G06F 9/30014 |
| | | | 710/2 |
| 7,882,081 B2 | * | 2/2011 | Stager ............... G06F 17/30067 |
| | | | 707/691 |
| 8,004,855 B2 | | 8/2011 | Salama et al. |
| 8,533,431 B2 | | 9/2013 | Master et al. |
| 8,918,278 B2 | | 12/2014 | Feldman et al. |
| 2005/0100022 A1 | * | 5/2005 | Ramprashad ........... H04L 47/10 |
| | | | 370/395.42 |
| 2006/0156074 A1 | | 7/2006 | Kumar |
| 2011/0029649 A1 | * | 2/2011 | Tian ................... H04L 65/4084 |
| | | | 709/223 |
| 2011/0307647 A1 | | 12/2011 | Stalzer |
| 2013/0282777 A1 | | 10/2013 | Guo et al. |
| 2013/0282778 A1 | | 10/2013 | Sun et al. |
| 2014/0089699 A1 | | 3/2014 | O'Connor et al. |
| 2015/0074374 A1 | | 3/2015 | Zhang et al. |
| 2015/0074380 A1 | | 3/2015 | Huang et al. |
| 2015/0371063 A1 | | 12/2015 | Van Antwerpen et al. |

\* cited by examiner

RECONFIGURABLE DATA INTERFACE UNIT FOR COMPUTE SYSTEMS

BACKGROUND OF THE INVENTION

The present disclosure is directed to digital signal processing, including data organization for flexible computing systems.

The components of electronic systems such as computers and more specialized compute systems are often integrated into a single integrated circuit or chip referred to as a system-on-chip (SoC). A SoC may contain digital, analog, mixed-signal, and radio-frequency functions. A SoC can include a microcontroller, microprocessor or digital signal processor (DSP) cores. A SoC may additionally or alternatively include specialized hardware systems such as dedicated hardware compute pipelines or specialized compute systems. Some SoCs, referred to as multiprocessor System-on-Chip (MPSoC), include more than one processor core or processing unit. Other components include memory blocks such as ROM, RAM, EEPROM and Flash, timing sources including oscillators and phase-locked loops, peripherals including counter-timers, real-time timers and power-on reset generators, external interfaces including industry standards such as USB, FireWire, Ethernet, USART, SPI, analog interfaces such as analog-to-digital converters (ADCs) and digital-to-analog converters (DACs), and voltage regulators and power management circuits.

SUMMARY

In one embodiment, an apparatus is provided that includes a first set of line buffers configured to store a plurality of data blocks from a memory of a system-on-chip and a field composition circuit configured to generate a plurality of data segments from each of the data blocks. The field composition circuit is reconfigurable to generate the data segments according to a plurality of reconfiguration schemes. The apparatus includes a second set of line buffers configured to communicate with the field composition circuit to store the plurality of data segments for each data block, and a switching circuit configured to generate from the plurality of data segments a plurality of data streams according to an execution pattern of a processing unit of the system-on-chip.

In one embodiment, a method is provided that includes generating from each of a plurality of data blocks a plurality of data segments, storing the plurality of data segments for each data block in a set of line buffers, selectively reading from the set of line buffers to combine portions of data segments from multiple data blocks to form a plurality of data streams, and storing the plurality of data streams in a set of input/output (I/O) buffers based on a plurality of execution patterns for a processing unit of a system-on-chip (SoC).

In one embodiment, a system-on-chip is provided that includes one or more memory devices, a plurality of buses coupled to the one or more memory devices, and a plurality of compute systems coupled to the plurality of buses. Each compute system includes a processing unit configured to receive a plurality of data streams corresponding to a plurality of execution patterns of the processing unit, a controller coupled to the processing unit, and a reconfigurable data interface unit (RDIU) coupled to the processing unit and the plurality of buses. The RDIU is configured to receive a plurality of data blocks from the plurality of buses that are associated with one or more memory addresses. The RDIU is configured to generate the plurality of data streams by decomposing each of the data blocks into a plurality of data segments and combining data segments from multiple data blocks according to the plurality of execution patterns of the processing unit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
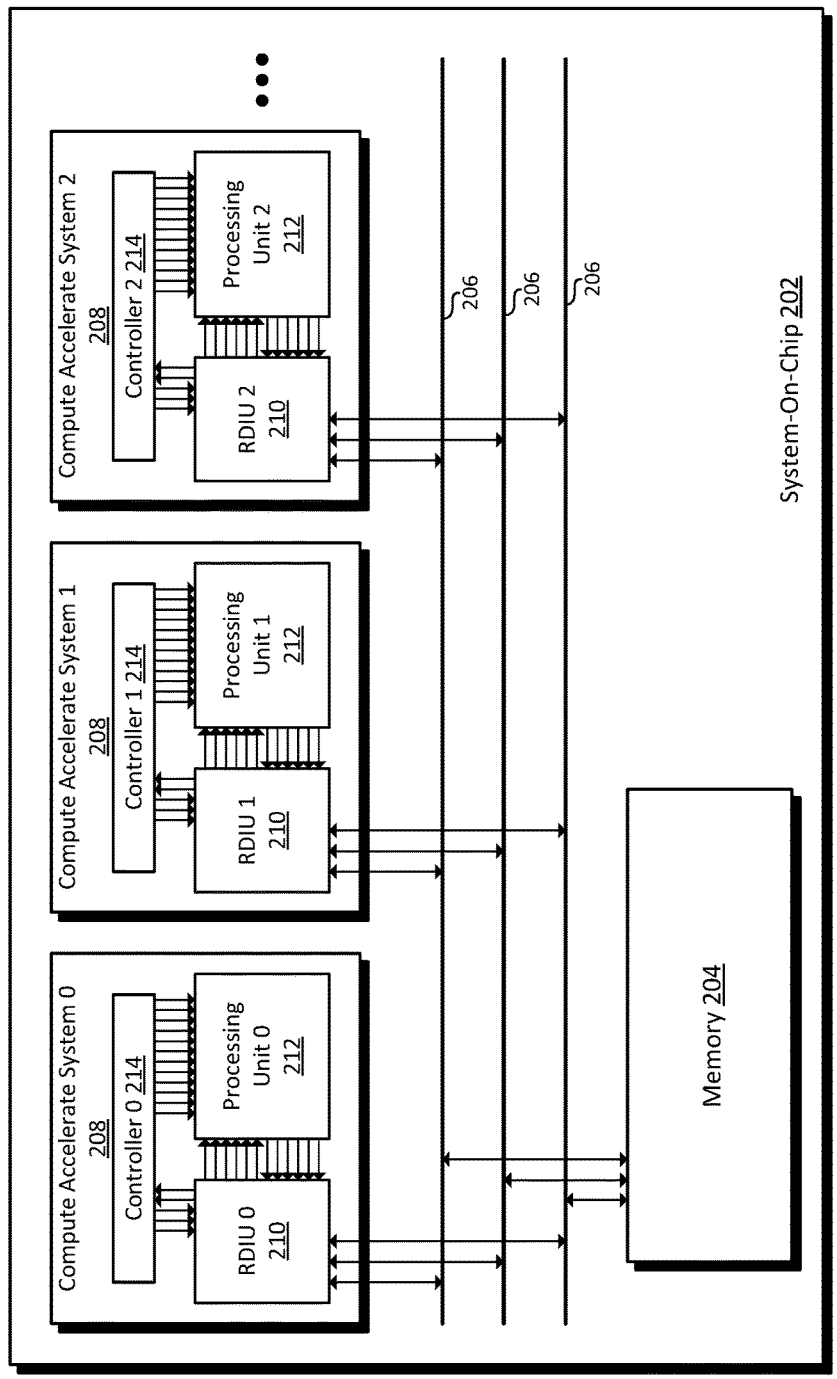
FIG. 1 is a block diagram of a system-on-chip including a compute accelerate system in accordance with one embodiment of the disclosed technology.

A system-on-chip (SoC) with related circuitry and operations is described that provides a reconfigurable data interface between a memory coupled to one or more data buses of the SoC and one or more processing units of the SoC. The SoC includes a memory hierarchy comprising memory hardware structures that store and transfer data over the data buses according to memory addresses. The memory may transfer data in data blocks or other units based on a memory address of the data source. The SoC includes one or more compute systems such as flexible compute accelerate systems including the one or more processing units. A processing unit is configured with one more predefined execution paths that operate on data operands as data streams. The reconfigurable data interface is configured to reorganize the address-based data from the memory into data streams that are prepared in patterns that match with operation steps in the execution paths of the processing unit. The reconfigurable data interface is further configured to access result data from the processing unit having a data structure that reflects the executions paths in the processing unit. The interface is configured to reorganize the result data into one or more data blocks for the memory based on memory address.

The SoC may include one more data buses that are coupled to provide communication between one or more compute systems and one or more memory hardware structures. A reconfigurable data interface may include one more circuits that provide sustained data transfers between a memory system and the one or more compute systems. The data transfers are provided at a high-bandwidth and with wide bit widths. The RDIU receives data in data block or other groupings from the memory over the one or more data buses and stores the data blocks in a first set of line buffers. The RDIU organizes and stores the data elements from the data block in buffers based on how the data elements are to be used in executions patterns within the processing unit. The RDIU may first generate a plurality of data segments from each data block and store the data segments in a second set of line buffers. The RDIU may reorganize the data elements from the data block in generating the data blocks, for example, by performing interleaving or shifting, to generate data for the execution paths of the processing unit. The RDIU reads the data elements from the second set of line buffers and further organizes the data for storage in a set of input/output (I/O) buffers of the RDIU. The RDIU may select data elements from the various data blocks and merge the elements from multiple data blocks to compose a set of data streams for the processing unit. The set of data streams are stored in the set of I/O buffers as organized data operands to supply input data streaming ports of the processing unit. The data operands match the execution patterns of the processing units. The data elements provided to the processing units are not associated with a particular memory address, but instead, match a particular port and cycle time for the processing unit.

The RDIU is reconfigurable during runtime to prepare data with different patterns for consumption by the processing unit. In one embodiment, configuration bits can be pre-loaded to switch the RDIU between data pattern configurations. The configuration bits may be used by select circuitry to organize data blocks into data segments based on different reconfiguration schemes. The configuration bits may also be used by address generation units coupled to the second set of line buffers and the set of I/O buffers to read data elements from buffered data according to a selected data pattern. The address generation units may also be used to write data elements to selected locations. The configuration bits may be used by a switching circuit to change the routing of data elements between the second set of line buffers and the set of I/O buffers. The configuration bits can be changed to provide cycle-by-cycle data matching of the buffered data operands and the operations in the data paths of the processing unit.

After execution by the processing unit, data is provided at the output ports of the processing unit. The result data is provided in fixed data patterns according to the execution path used in the processing unit. The RDIU accesses the result data and stores it in the set of I/O buffers. The RDIU determines memory address locations corresponding to the result data based on the execution patterns of the processing unit. The data is reorganized based on memory addresses and is stored in the second set of line buffers. The reorganized data is then regrouped from individual data segments into data blocks which are stored in the set of first line buffers and transferred to the memory over the data buses.

FIG. 1 is a block diagram of a system-on-chip (SoC) 200 according to one embodiment of the disclosed technology. SoC 200 includes a memory 204 that is coupled to a plurality of data buses 206. Each data bus 206 is also coupled to a plurality of compute accelerate systems (CAS) 208. Each CAS 208 includes a reconfigurable data interface unit (RDIU) 210 coupled to each of the data buses 206. Each CAS 208 further includes a controller 214 and a processing unit (PU) 212 coupled to the corresponding RDIU 210. FIG. 1 shows three compute accelerate systems and three data buses by way of example. A system-on-chip in accordance with the disclosed technology may include any number of CAS's and data buses. SoC may also include additional components such as additional hardware modules, interfaces, controllers, and processors.

Memory 204 may include any type of memory hierarchy and typically will contain multiple memory hierarchy layers including various hardware structures and features. Memory 204 is configured to store data that is structured with memory addresses. Data is typically stored in memory 204 and transmitted over data buses as data blocks with a first data structure. A data block may include one or more pages of data. A data block is typically the smallest unit of data that can be accessed from memory 204 and transferred on one or more data buses 206. Various ones of the data buses may connect to and provide communication amongst the different hierarchical layers as well as connect to the RDIU of each CAS.

Each compute acceleration system 208, which may be referred to simply as a compute system, provides a flexible compute accelerate system in one embodiment. A flexible compute accelerate system includes a processing unit (PU) 212 that provides a data flow machine with pre-defined execution paths. Each processing unit executes pre-defined sequences of operations while operating in a slave mode under the direction of controller 214. Controller 214 provides triggering signals to initiate executions by the corresponding PU 212. The controller can provide a start signal to the processing unit to synchronize input data streaming buffers of the processing unit with executions in the processing unit. Data operands are sent from the corresponding RDIU at a pre-defined time and location and data results are extracted from each PU 212 at a pre-defined time and location. In one embodiment, each CAS is an application-specific integrated circuit (ASIC). A single processing unit is shown for each CAS but more than one PU may be included in a single CAS under the control of a corresponding controller.

The data operands for each PU 212 are prepared by the corresponding RDIU and/or PU 212 as data streams. The data streams are prepared in patterns that match cycle-by-cycle with operations in the datapaths defined within the corresponding PU 212. To organize the data streams for the PU, the RDIU may break the original data blocks into segments, and take individual segments or data elements from the segments to compose the data streams. The RDIU arranges data elements in orders that match with execution patterns of the data paths inside the processing units. This may include at which cycle time a particular data operand should be sent through a particular input port of a processing unit.

The data results generated by the PU 212 reflect the execution patterns within the PU 212. The RDIU re-organizes the data results from the PU execution patterns as data blocks. The data blocks are associated with addresses and are sent to one or more data buses 206 for storage in the memory 204. In this manner, the RDIU prepares execution pattern associated data streams for high-speed, high-data bandwidth, and no-bubble pipelining execution by the processing units. The RDIU receives execution pattern data results and prepares data blocks for transmission on one or more data buses without bubbled processing. The no-bubble pipelining execution includes providing and receiving data streams from the processing units without buffering data over more than one data cycle.

A processing unit (PU) may include a certain programmability with execution patterns that may have different execution patterns. For example, each processing unit (PU) 212 may be configured using a field-programmable gate array (FPGA) in one embodiment. A FPGA can provide reconfigurable intensive processing of data. The FPGA processing unit sustains high throughput data streams of both input data and output data. The FPGA is a customizable hardware unit that is configured to operate on tailored data streams that sustain pipelining of execution schemes in the hardware system. This sustained data transfer uses a high bandwidth interconnect between different hardware blocks in the SoC. The sustained data transfer further utilizes tailored schemes or data patterns for the data streaming. In other examples, other processing units can be used. The FGPA or other processing unit may be reconfigured during operation to provide different execution patterns or different subsets of execution patterns at different times. The different execution patterns may operate on different data patterns. Accordingly, the RDIU may reorganize data according reconfigurable execution patterns provided by the processing unit.

Typically, the data in the hardware layers of memory 204 is not stored in structures that are aligned with the various execution schemes provided by the compute accelerate systems 208. To facilitate efficient utilization of the computing capacities of each CAS, the corresponding RDIU provides an organization of the data from memory 204 based on the execution schemes of the CAS. The compute accelerate systems are programmable accelerate systems such that the execution schemes and corresponding data structures or patterns may vary, even cycle by cycle during processing. Accordingly, each RDIU is reconfigurable to change the data organization for the corresponding PU for each data cycle.

Each RDIU provides a scalable interface between the different hierarchical layers of memory 204 and the programmable CAS 208. The RDIU provides reconfigurable schemes for forming data streams to match the execution patterns of the corresponding PU. Additionally, the RDIU is reconfigurable to provide re-organizations of different execution results with different patterns into data blocks for the data buses. The RDIU provides an extended pipeline between processing units of accelerate systems and buses outside of the accelerate systems. The RDIU converts data structured with memory addresses for memory 204 and data streams according to execution patterns of PUs 212.

Each RDIU provides bridge-sustained data transfers between the high-throughput executions of the corresponding PU and the hierarchical memory system 204. Accordingly, the RDIUs provide high-bandwidth and wide bit width data transfers between memory 204 and the PUs of the compute accelerate systems. The RDIU performs data preparation functions that organize data from memory 204 into patterned streams that drive no-bubble-pipelining executions by the PUs. The data is organized in a transient scheme in one embodiment. Input data from memory can be organized by going through the execution pipeline stage of the RDIU. The data from memory 204 is organized and stored in buffers within the RDIUs based on how data elements will be used in execution patterns by the PUs. Typically, the data from the memory is not accessible by address after organization into streams for the execution patterns.

Each RDIU is reconfigurable by configuration bits. The configuration bits are pre-loaded binary bits in one example. During runtime execution, the RDIU can be reconfigured to prepare data with different patterns for the corresponding PU by switching from one set of configuration bits to another set of configuration bits. The RDIU is a parameterized design that is scalable in one embodiment. The configuration bits may be stored in configuration buffers within the RDIU. The address of the configuration buffers can be changed to select a particular set of binary bit patterns so that the programming circuits will be set to form the desired scheme for the data streams.

Figure 2:
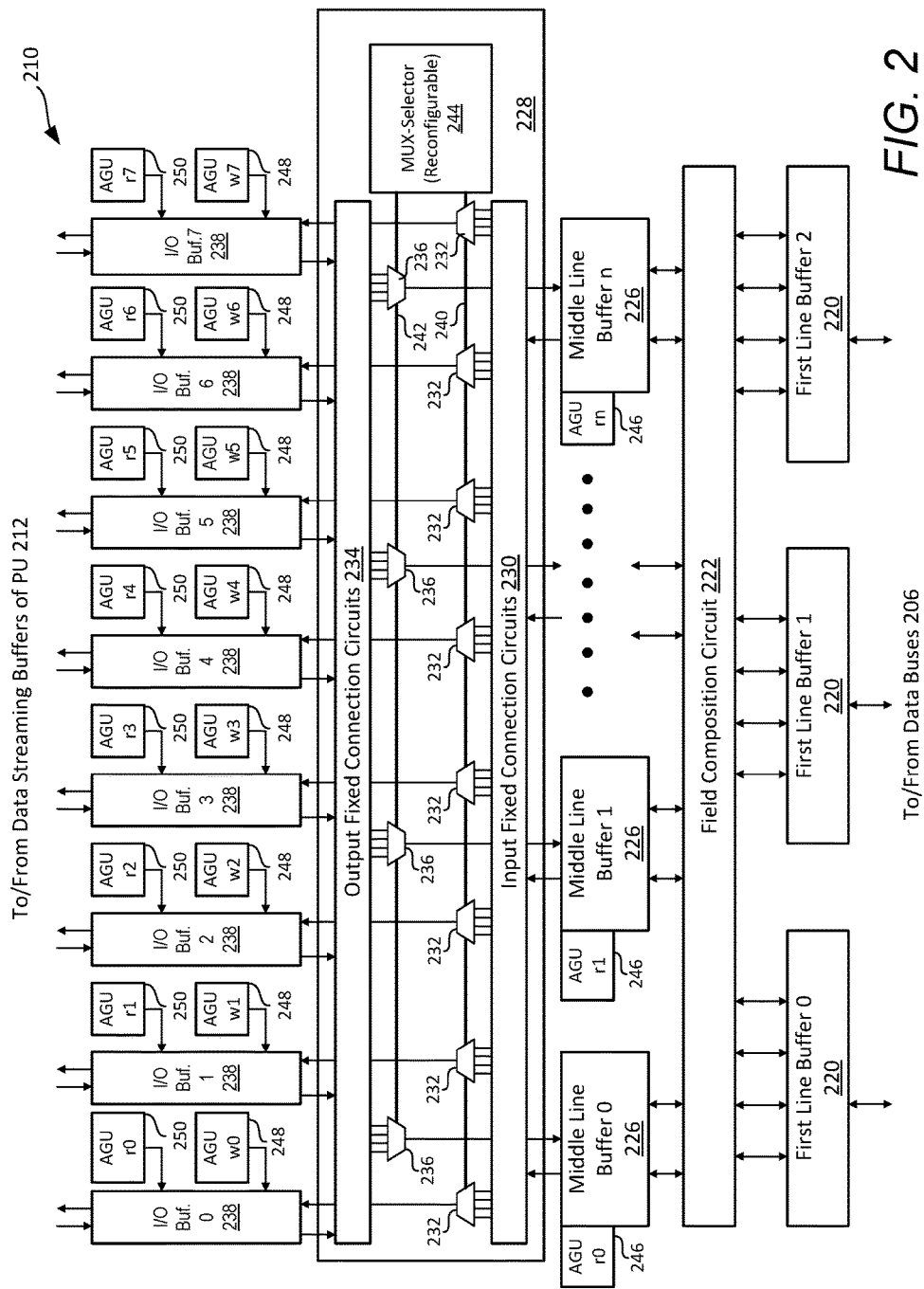
FIG. 2 is a block diagram of a reconfigurable data interface unit (RDIU) in accordance with one embodiment of the disclosed technology.

FIG. 2 is a block diagram of a reconfigurable data interface unit (RDIU) 210 in accordance with one embodiment. RDIU 210 provides two directions of data transfer. In a first direction, data may be input from memory over one or more data buses 206 that are coupled to data ports that couple to the data buses of the SoC. The RDIU outputs data to data ports that are coupled to a set of streaming data buffers of a corresponding PU 212 of the CAS. In a second direction, data is input from the corresponding PU and is output to a memory over the data buses. RDIU 210 is configured to provide a high-bandwidth data transfer with the data buses using wide data bit widths. Typically, the data is transferred in data blocks. For example, the RDIU may transmit data blocks with a data bus using a bit width of 256 or 512 bits. RDIU 210 is configured to organize the data blocks and store them in buffers based on how data elements will be used in the execution patterns of a corresponding PU. RDIU 210 is further configured to receive execution results from a corresponding PU and re-organize the execution results as data blocks for transmission on a data bus.

RDIU 210 includes a set of first line buffers 220 that are coupled to data ports which are in turn coupled to a plurality of data buses of a system-on-chip 202 as shown in FIG. 1. In one example, each first line buffer serves a dedicated data bus. In another example, the first line buffers may store data for any one of the data buses or a subset of the data buses. In one embodiment, each first line buffer 220 is configured with a bit width to store data transferred according to the bit width of one or more of the data buses. For example, each first line buffer can store a data block such as a page of data received or sent over one or more of the data buses. The data may be stored in memory as blocks based on the same parameters and/or original variable names as in source programs. The data may depend on the physical location of the producers of the data and the location at which data blocks are stored. The data items are originally associated with a particular memory address. Although three first line buffers are shown by way of example, any number of first line buffers may be used to store the input data. Additionally, multiple lines or depths of first line buffers may be used. Generally, the depth of the first line buffers is between 1-3 to support writing a new line of data and reading out a previous line of data in parallel.

The set of first line buffers are configured for bi-directional communication with a field composition circuit 222. Field composition circuit 222 is in turn configured for bi-directional communication with a set of middle line buffers 226. Field composition circuit 222 is one type of selection circuit that may be used to transmit data between the first line and middle line buffers to provide restricting of the data.

The field composition circuit 222 includes a field-decomposer circuit that is configured to generate smaller data segments from the original data blocks. The field decomposer decomposes the original data structure of each data block in buffers 220 into a plurality of data segments. The field decomposer circuit distributes the individual segments to the middle line buffers 226. In order to support a wide range of different distribution patterns for the PU 212, the field composer may provide redundancy by storing the same data segment in multiple middle line buffers 226. This enables a data segment to be used multiple times to generate data streams for the PU 212. Where redundancy is used, the accumulated or total bit width of a line of middle-line-buffers is larger than the accumulated or total bit width of a line of first line buffers. Although a single line of middle line buffers is used, multiple stages of middle-line-buffers may be used to handle various patters of data distributions, for example, when the total input bit width is high.

Because data preparations are derived from the cycle-by-cycle execution patterns inside the processing unit, the field decomposer circuit may begin reorganizing the data elements from the original data block in creating smaller data segments. For example, the field decomposer may select data elements according to a particular data pattern. For instance, the field decomposer may utilize interleaving to select columns or rows from sequential data bits in a data block. Other data reorganization patterns can be applied in creating the data segments. Thus, the data segments may have a data structure that is different than that of the data blocks.

Each middle line buffer 226 is coupled to an address generation unit (AGU) 246. The AGU includes logic circuitry in one embodiment that is configured to send out of the corresponding middle line buffer one word for each data cycle. The AGU is configurable to cause the middle line buffer to provide a particular data pattern. By way of non-limiting example, an AGU 246 may be configured to read every other bit from the middle line buffer or data corresponding to a particular column of data received in a sequential data sequence from the field composition circuit. This permits data to be extracted from the middle line buffer and further organized according to a selected pattern for a particular computation by the processing unit. For example, if the data in the middle line buffer represents a four by four matrix of data, but is stored in a sequential format, the AGU can be used to select the $1^{st}$, $5^{th}$, $9^{th}$, and $13^{th}$ items to select a first column of data from the sequential format. Similarly, the AGU can select the $2^{nd}$, $6^{th}$, $10^{th}$, and $14^{th}$ items to select the second column etc.

The set of middle line buffers 226 are configured for bi-directional communication with a switching circuit 228. The switching circuit includes fixed connection and MUX connections that are switchable to selectively couple the middle line buffers 226 to a set of input/output (I/O) buffers 238. The switching circuit includes one or more input fixed connection circuits 230 that are coupled to the set of middle line buffers to provide data from the set of middle line buffers 226 to a set of input multiplexers (MUXs) 232. In this example, each input multiplexer includes four inputs and one output. The output is coupled to one of the I/O buffers 238. The inputs are coupled to the input fixed connection circuit 230. Any number of inputs for the multiplexers may be used to provide additional or fewer connecting patterns. The input fixed connection circuits 230 include fixed connection patterns between the middle line buffers 226 and the input multiplexers 232. The fixed connection circuits 230 can include connections between four of the middle line buffers 226 and one of the input multiplexers in this example. In other examples, different numbers or types of connection patterns can be used.

The switching circuit 228 further includes one or more output fixed connection circuits 232 that are coupled to the set of I/O buffers to provide result data from the set of I/O buffers 238 to a set of output MUXs 236. In this example, each output multiplexer includes four inputs and one output. The output is coupled to one of the middle line buffers 236. The inputs are coupled to the output fixed connection circuit 234. Any number of inputs for the multiplexers may be used to provide additional or fewer connecting patterns. The output fixed connection circuits 230 include fixed connection patterns between the I/O buffers 238 and the output multiplexers 236. The fixed connection circuits 234 can include connections between four of the I/O buffers 238 and one of the output multiplexers in this example. In other examples, different numbers or types of connections patterns can be used.

Switching circuit 228 includes a MUX-selector circuit 244. MUX-selector circuit 244 includes a first output 240 that is coupled to the set of input multiplexers and a second output 242 that is coupled to the set of output multiplexers. The MUX-selector is configurable to select a particular input for each of the input multiplexers 232 using the first output 240. In this manner, an input multiplexer selects a particular input corresponding to a particular middle line buffer based on the first output 240 of the MUX-selector. The MUX-selector is configurable to select a particular input for each of the output multiplexers 234 using the second output 242. In this manner, an output multiplexer selects a particular input corresponding to a particular I/O buffer based on the second output 242 of the MUX-selector. The MUX-selector circuit 244 is reconfigurable for each data cycle to provide a selected pattern of data from the middle line buffers to the set of I/O buffers. A set of configuration bits can be used to control the MUX selector circuit 238 to select different inputs for the MUXs during every cycle.

To organize data streams for the processing units, the set of I/O buffers store organizations of data portions of the data segments from the data blocks. The I/O buffers can collect data portions from multiple original data blocks in order to compose a set of data streams. The organized data streams are stored in the set of I/O buffers before they are sent to the processing unit. In one embodiment, an I/O data buffer is provided for each input port and output port of the processing unit. Each I/O buffer 238 may include a data buffer bank. In one embodiment, each I/O buffer 238 includes a set of input data buffers for receiving data from the PU that is larger than a set of output data buffers for providing data to the PU.

Each I/O buffer 238 is coupled to a write address generation unit (AGUw) 248 and a read address generation unit (AGUr). When data is written to an I/O buffer 238 from a middle line buffer in the input direction, a corresponding write address generation unit selects where the data will be written in the I/O buffer. This permits data to be merged from different data blocks into the I/O buffer. Additionally, this permits data to be prepared for the PU by merging data over a number of cycles before transmitting the data stream to the PU. The AGU is configurable to cause the I/O buffers to further refine a particular data pattern before providing the data to the PU 212.

When data is read from an I/O buffer 238 in the input direction for transmission to the PU 212, a corresponding read address generation unit 250 selects the data to be read from the buffer. In one embodiment, the I/O buffers have a larger bandwidth for writing data to the buffer than reading data from the buffer. This facilitates the maintenance of the input data bandwidth equal to the output data bandwidth.

The data preparation and organization in the set of I/O data buffers 238 is derived from the cycle-by-cycle execution patterns inside the processing unit. The processing unit may include one or more reconfigurable datapaths for particular operations. The operand data from the set of I/O buffers can be sent for each step of an operation to the appropriate input port at a particular cycle time. Each processing unit may include streaming input buffers that are arranged at the boundary of the processing unit. These streaming input buffers may take a fixed number of clock cycles to move data from the entrance point to the point where the data is used for computations. Typically, the processing unit will include multiple input streaming buffers. There is a cycle time for the data contents of each of the input buffers to be used in computations at different cycle times. Together, the input streaming buffers are synchronized with a start signal from the controller 214 to the processing unit 212. The controller is configured to provide a start signal to the processing unit to synchronize the input data streaming buffers with executions in the processing unit. Similarly, multiple output streamlining buffers are arranged for the output ports of the processing unit and the same synchronization scheme can be applied to get results back to the memory space.

Once the streams are sent into the processing unit, each of the data pieces is no longer associated to any memory address. Instead, each data piece is sent through particular port of the PU 212 at a specific cycle time. A reverse process happens to each result generated by the processing unit. The controller 212 inside each compute accelerate system coordinates the data preparations in the RDIU and executions inside the corresponding PU.

A data piece will be collected from a particular output of a processing unit at a specific cycle time and stored in an I/O buffer. The results appear at the outputs of the processing unit in fixed patterns. The result data generated by the PU is stored in the I/O buffers at the RDIU according to the execution sequences of the PU. The RDIU accesses the results from each output port on the PU at the appropriate cycle times. The results are stored in the corresponding I/O data buffers.

Based on the execution patterns of the PU, the RDIU determines reorganization operands/results in order to assign the particular data items specific address locations in memory 204. The RDIU determines the memory addresses for each data piece and puts it together with other data pieces that belong to the same data block. The RDIU reorganizes the data based on the memory addresses, and stores the reorganized data in the middle line buffers 226 as data segments. The RDIU may further compose the data segments in multiple middle line buffers into longer data words or other groupings and store them in the first line buffers. A field composer circuit within the field composition circuit can generate data for storage as data blocks in the first line buffers 220. The field composer circuit can compose from data segments stored in the middle line buffers data words or pages for storage as data blocks in the first line buffers. From the first line buffers, the data blocks can be sent to memory 204 over one or more data buses 206.

Figure 3:
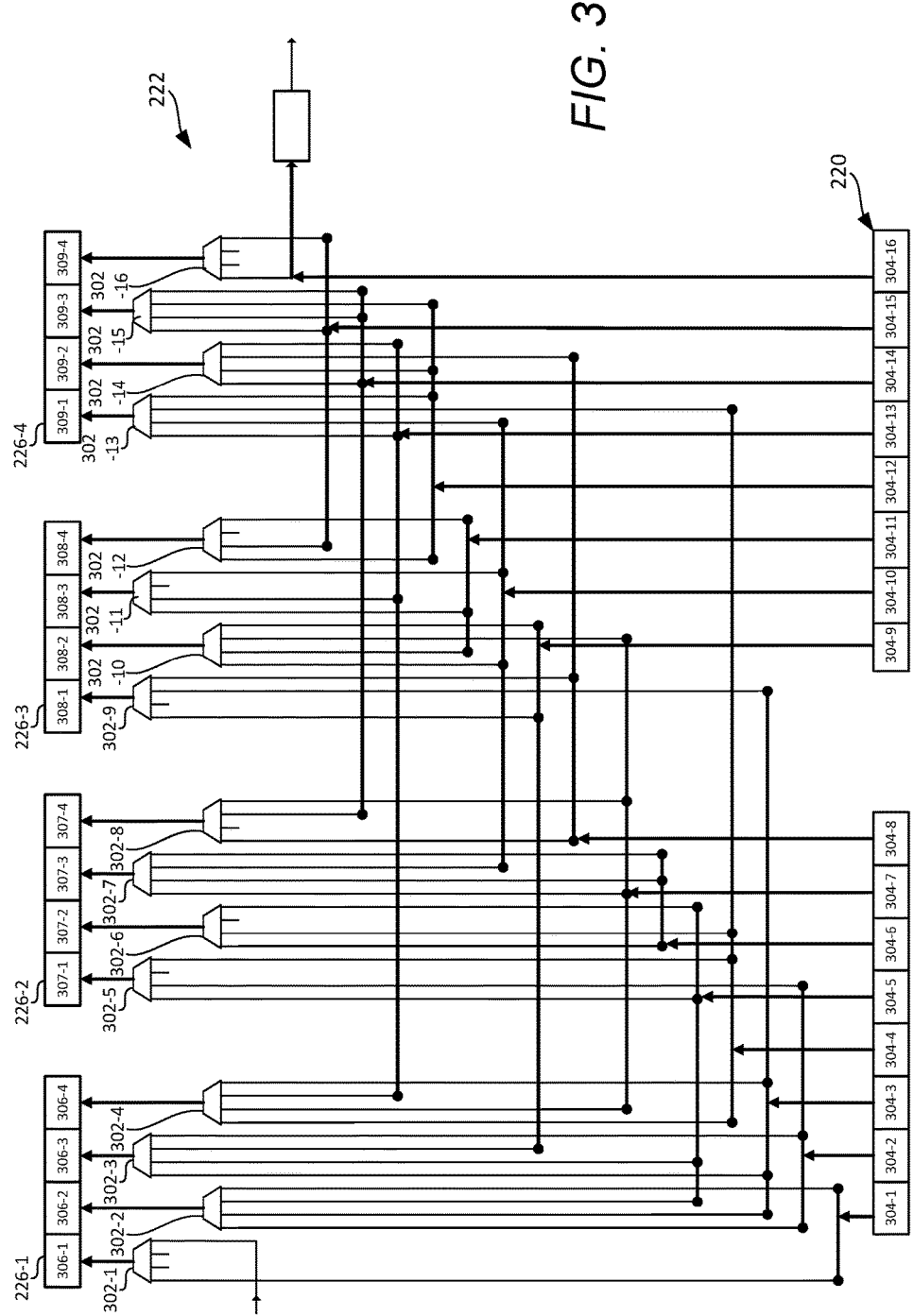
FIG. 3 is a block diagram of a composition circuit in accordance with one embodiment of the disclosed technology.

FIG. 3 is a block diagram describing one embodiment of a selection circuit such as a field composition circuit according to the disclosed technology. FIG. 3 shows one example of decomposing and composing data between one first line buffer 220 and four middle line buffers 226-1, 226-2, 226-3, and 226-3. In this example, the base data width in the interconnections is 32 bits. The input bus width is 512 bits shown as two 256 bits portions. The first line buffer stores a 512 bit data block as sixteen 32 bit groups 304. The input data from the first line buffer can be organized in various formats or schemes for storage in the four second line buffers. Configuration bits can be used for select lines (not shown) of the multiplexers 302 to organize the data in the different schemes within the middle line buffers 226-1, 226-2, 226-3, and 226-4. Each middle line buffer 226-1 stores four 32 bit groups 306. The configuration bits are used to select different inputs for the multiplexers to organize the data when transferring the data from the first line buffer to the middle line buffers.

A first scheme is illustrated where the input data stored in the first line buffer 220 is separated into four sequential data segments which are stored in the middle line buffers 226-1, 226-2, 226-3, and 226-4. A first data group 304-1 of first line buffer 220 is routed through the first input of multiplexer 302-1 to the first group 306-1 of middle line buffer 226-1. The second data group 304-2 of first line buffer 220 is routed through the first input of multiplexer 302-2 to the second group 306-2 of middle line buffer 226-1. Each input data group is routed sequentially so that middle line buffer 226-1 stores a first data segment including groups 304-1, 304-2, 304-3, and 304-4. Middle line buffer 226-2 stores a second data segment including groups 304-5, 304-6, 304-7, and 304-8. Middle line buffer 226-3 stores a third data segment including groups 304-9, 304-10, 304-11, and 304-12. Middle line buffer 226-3 stores a fourth data segment including groups 304-13, 304-14, 304-15, and 304-16.

A second scheme is illustrated where the input data is separated by two-way interleaving. This scheme may be useful to collect columns in separate middle line buffers for a two-column matrix. In two-way interleaving, the initial data block is separated into four data segments, with each segment including a sequence of every other data group. For example, a first data segment stored in middle line buffer 226-1 includes groups 1, 3, 5, and 7. Group 304-1 from the first line buffer 220 is routed through the first input of multiplexer 302-1 to the first group 306-1 of buffer 226-1. A third data group 304-3 of first line buffer 220 is routed through the second input of multiplexer 302-2 to the second group 306-2 of buffer 226-1, etc.

A second data segment stored in middle line buffer 226-2 includes groups 2, 4, 6, and 8. Group 304-2 from first line buffer 220 is routed through the first input of multiplexer 302-5 to the first group 307-1 of buffer 226-2. A fourth data group 304-4 from first line buffer 220 is routed the second input of multiplexer 302-6 to the second group 307-2 of buffer 226-2, etc. A third data segment stored in middle line buffer 226-3 includes groups 9, 11, 13, and 15. Group 304-9 from first line buffer 220 is routed through the first input of multiplexer 302-9 to the first group 308-1 of buffer 226-3. Group 304-11 from first line buffer 220 is routed through multiplexer 302-10 to the second group 308-2 of buffer 226-3, etc. A fourth data segment stored in middle line buffer 226-4 includes groups 10, 12, 14, and 16. Group 304-10 from first line buffer 220 is routed through multiplexer 302-13 to the first group 309-1 of buffer 226-4. Data group 304-12 from first line buffer 220 is routed through the first input of multiplexer 302-14 to the second group 309-2 of buffer 226-4, etc.

A third reorganization scheme is illustrated where the input data stored in the first line buffer 220 is separated by four-way interleaving. This scheme may be useful to collect columns in separate middle line buffers for a four-column matrix. In four-way interleaving, the initial data block is separated into four data segments, with each segment including a sequence of every fourth data group. For example, a first data segment stored in middle line buffer 226-1 includes groups 1, 5, 9, and 13. Group 304-1 from first line buffer 220 is routed through the first input multiplexer 302-1 to the first group 306-1 of buffer 226-1. Data group 304-5 from first line buffer 220 is routed through the third input of multiplexer 302-2 to the second group 306-2 of buffer 226-1, etc.

A second data segment stored in middle line buffer 226-2 includes groups 2, 6, 10, and 14. Group 304-2 from first line buffer 220 is routed through the second input of multiplexer 302-5 to the first group 307-1 of buffer 226-2. Data group 304-6 from first line buffer 220 is routed through the second input of multiplexer 302-6 to the second group 307-2 of buffer 226-2, etc. A third data segment stored in middle line buffer 226-3 includes groups 3, 7, 11, and 15. Group 304-3 from first line buffer 220 is routed through the third input of multiplexer 302-9 to the first group 308-1 of buffer 226-3. Group 304-7 from first line buffer 220 is routed through the third input of multiplexer 302-10 to the second group 308-2 of buffer 226-3, etc. A fourth data segment stored in middle line buffer 226-4 includes groups 4, 8, 12, and 16. Group 304-4 from first line buffer 220 is routed through the third input of multiplexer 302-13 to the first group 309-1 of buffer 226-4. Data group 304-8 from first line buffer 220 is routed through the third input of multiplexer 302-14 to the second group 309-2 of buffer 226-4, etc.

A fourth reorganization scheme is depicted for shifting the data groups to the right. This may be useful in aligning the heads of data blocks in particular buffers. The initial data block is separated into four data segments, with each segment including a set of sequential data groups. However, the groups are shifted to the right by 32 bits. The first group (leftmost) of the data segment stored in middle line buffer 226-1 is data shifted in from another first line buffer or elsewhere. Thus, the first data segment stored in middle line buffer 226-1 includes a first shifted in group and groups 1, 2, and 3 from the first line buffer 220-1. The shifted in group is routed through the fourth input of multiplexer 302-1 to the first group 306-1 of buffer 226-1. Data group 304-1 from first line buffer 220 is routed through the fourth input of multiplexer 302-2 to the second group 306-2 of buffer 226-1, etc.

A second data segment stored in middle line buffer 226-2 includes groups 4, 5, 6, and 7. Group 304-4 from first line buffer 220 is routed through the fourth input of multiplexer 302-5 to the first group 307-1 of buffer 226-2. Data group 304-5 from first line buffer 220 is routed through the fourth input of multiplexer 302-6 to the second group 307-2 of buffer 226-2, etc. A third data segment stored in middle line buffer 226-3 includes groups 8, 9, 10, and 11. Group 304-8 from first line buffer 220 is routed through the fourth input of multiplexer 302-9 to the first group 308-1 of buffer 226-3. Group 304-9 from first line buffer 220 is routed through the fourth input of multiplexer 302-10 to the second group 308-2 of buffer 226-3, etc. A fourth data segment stored in middle line buffer 226-4 includes groups 12, 13, 14, and 15. Group 304-12 from first line buffer 220 is routed through the fourth input of multiplexer 302-13 to the first group 309-1 of buffer 226-4. Data group 304-13 from first line buffer 220 is routed through the fourth input of multiplexer 302-14 to the second group 309-2 of buffer 226-4, etc. Additionally, group 304-16 can be shifted to the right (e.g., to another middle line buffer) by multiplexer 302-16.

Figure 4:
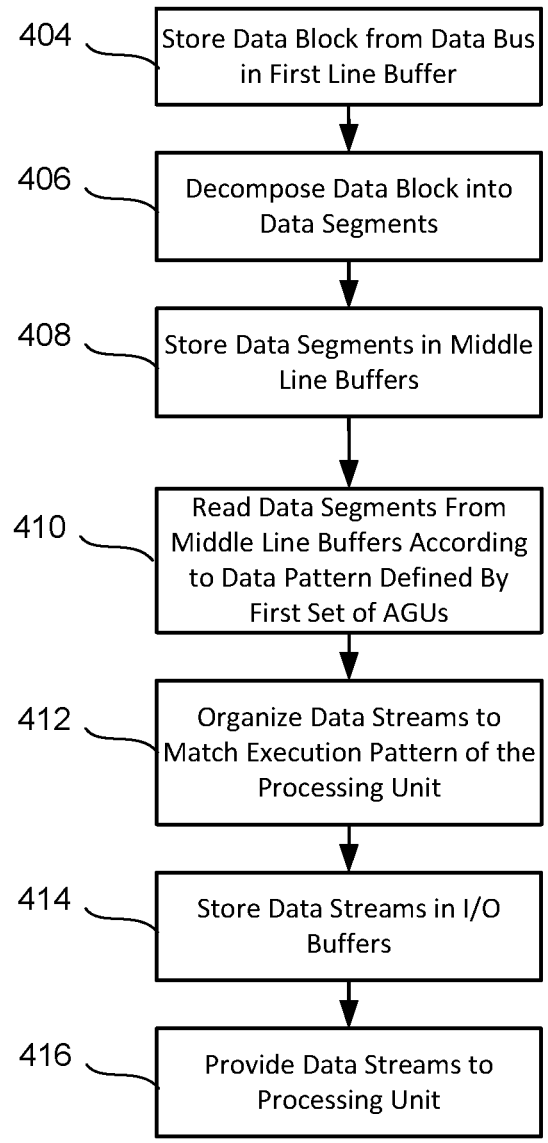
FIG. 4 is a flowchart describing a process of generating data streams according to execution patterns of processing in accordance with one embodiment of the disclosed technology.

FIG. 4 is a flowchart describing a process of reading data from memory and organizing the data into one or more data streams according to one embodiment. The RDIU accesses a data block over one or more data buses and stores the data block in one or more first line buffers at step 404. The data block is used as input data for a data operand. The data is accessed and stored and a relatively high bit width, such as 512 or 256 bits, for example. Other bit widths may be used. The data block is organized according to memory address in one or multiple memory hierarchical layers and may include a first data structure. Each data element in a data block may be associated with a particular memory address. The data block is typically based on the same parameters or original variable names used in source programs by the SoC. The data may depend on the physical location of the component that generated the data and the location at which the data block is stored At step 406, the RDIU decomposes the data block into a plurality of data segments. The data segments have a bit width that is less than the bit width of the original data block. In one embodiment, the data segments have a bit width that matches the bit width of a targeted data stream of the corresponding processing unit. For example, the data streams may be stored and transmitted at a 16 or 32 bit width in one example. In decomposing the data block, the RDIU may reorganize the data using various data reorganization schemes. The reorganization scheme is reconfigurable to change cycle by cycle when processing data. The RDIU may apply bit shifting or data interleaving in generating the plurality of data segments for a data block. In decomposing the data block, the RDIU may organize the original data elements according to the targeted execution pattern inside the processing unit for the data elements. The RDIU may utilize one or more field decomposer circuits to generate the data segments. The field decomposer circuits are reconfigurable according to configuration bits to generate data for the selected reorganization scheme. The field decomposer circuits may include one or more layers of multiplexers, for example, to provide configurable routing of the data elements from the data blocks.

At step 408, the RDIU stores the plurality of data segments in a plurality of middle line buffers. In one embodiment, the data is stored using redundancy such that one more of the data segments are stored in more than one middle line buffers. This approach provides access to the data segments by various ones of the I/O buffers to reuse data segments as needed for various operations. The middle line buffers have a bit width that is less than the bit width of the first line buffers. In this manner, the data segments have bit widths that are less than the bit widths of the data blocks from which they are generated. In one embodiment, the bit widths of the data segments match the bit widths of the target data stream.

At step 410, the RDIU reads from the data segments in the middle line buffers according to a selected data pattern. The selected data pattern may be defined by a set of address generation units coupled to the middle line buffers. The RDIU may read selected bits as specified by the AGU coupled to the corresponding middle line buffer. The AGU may change the scheme for selecting data from the middle line buffers cycle by cycle to provide various reorganizations of the data from the data segments. Reading the data according to a selected data pattern allows the RDIU to further refine and organize the data elements from the original data block for consumption by the PU. Reading according to the pattern allows portions or particular data elements from the data segments to be collected.

At step 412, the RDIU organizes the data read from the data segments into data streams that match an execution path of a corresponding processing unit. Before execution is started by the processing unit, the data operands are prepared in order to supply the input ports of the processing units. In one embodiment, the data streams have a bit width that is less than that of the data segments. In another example, the data streams may have the same bit width as the data streams. In one embodiment, the RDIU writes the data from the middle line buffers into a set of I/O buffers to organize the data into data streams. The data may be organized according to the data pattern specified by the AGUs of the middle line buffers. This may include arranging the data based on which cycle time a particular data operand needs to be sent through a particular input port of the processing unit. Data is organized based on how data elements will be used in execution patterns by the corresponding PU. In this manner, the data is no longer organized based on a memory address. Instead, the data is organized specifically for an execution pattern of the PU. The data may further be organized by combining data elements from different data segments of different data blocks to form the data streams in the I/O buffers. The RDIU organizes the data elements as data operands to supply input ports of the processing unit. The RDIU arranges the data elements in the set of I/O buffers in an order that matches with executions patterns of the data paths in the processing units.

At step 414, the organized data streams are stored in the set of I/O buffers. The I/O buffers may include a corresponding I/O buffer for each input port. The organized data streams may be stored in the appropriate I/O buffer for the processing unit port. In one embodiment, step 414 may include writing data to an I/O buffer at a location specified by a second set of AGUs coupled to the set of I/O buffers. The second set of AGUs may specify locations for storing data elements so that data elements from different data blocks and segment can be collected for a particular data stream. Typically, the organized data streams are stored with a lower bit width when compared with the input bit width. For example, the data streams may be stored and transmitted at a 16 or 32 bit width in one example.

At step 416, the data streams are provided to the corresponding processing unit. In one embodiment, the data streams are read according to a third set of AGUs coupled to the I/O buffers. The third set of AGUs may specify a read location for reading from the I/O buffer. The third set of AGUs can provide additional flexibility in organizing and providing the data to the processing unit. The data streams are provided to input data streaming buffers of the processing unit in one example.

Figure 5:
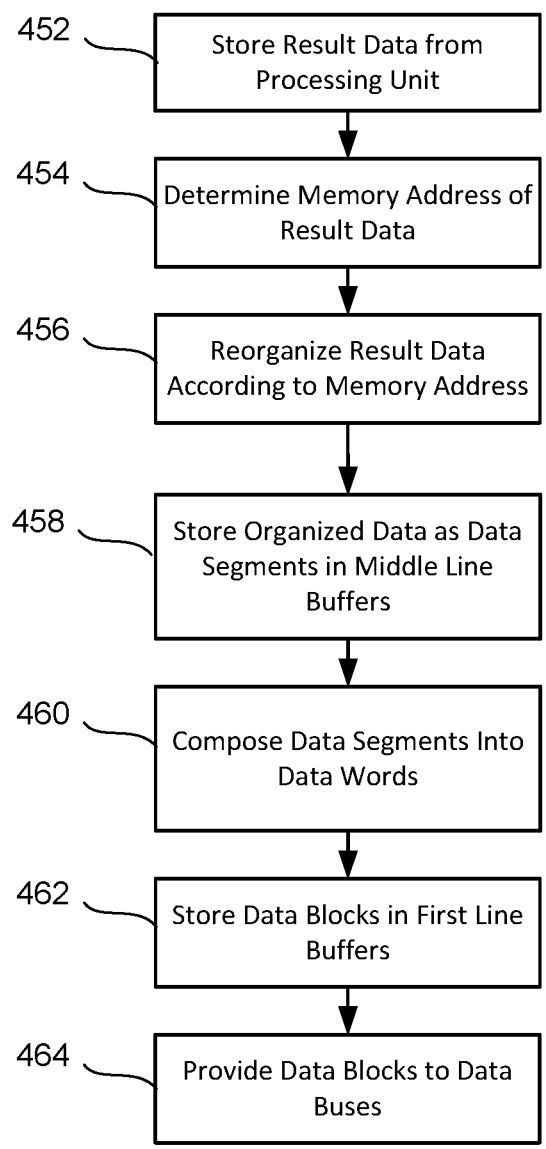
FIG. 5 is a flowchart describing a process of generating data blocks according to memory addresses in accordance with one embodiment of the disclosed technology.

FIG. 5 is a flowchart describing a process of accessing result data from a processing unit and reorganizing the data into data blocks for transmission to memory over one or more data buses according to one embodiment. At step 452, the RDIU accesses result data from the corresponding processing unit and stores the result data in the set of I/O buffers. The RDIU accesses and stores the result data from a particular output of the corresponding PU at a specific cycle time. The result data appears at the output ports of the processing units at specific cycle times. The result data can be stored in the I/O buffers of the RDIU according to the execution sequences of the PU. In one embodiment, the result data is provided from an output data streaming buffer of the PU. The result data can be collected from previously configured output ports of the processing units at the appropriate cycle times.

At step 454, one or more memory addresses for the result data are determined. Based on the execution patterns of the PU, the RDIU can determine where particular data items are to be placed. From the result data, the RDIU determines a specific memory address or addresses corresponding to memory 204. At step 456, the RDIU reorganizes the result data according to the memory addresses. The RDIU organizes result data together with other result data that is part of the same data block in one embodiment. At step 458, the RDIU stores the organized data as data segments in the middle line buffers. Step 458 may include storing result data as data segments for the same data block.

At step 460, the RDIU composes the organized data segments into longer data words or other groupings of data. The RDIU may transfer data segments for the same data block to the same first line buffer in one embodiment. At step 462, the RDIU stores the reorganized data blocks representing the result data in the first line buffers based on memory addresses. In this manner, the RDIU accesses the result data reflecting a fixed execution pattern of the PU and reorganizes the data into data blocks that can be stored in and transmitted between a memory hierarchy based on addresses. At step 464, the RDIU provides the data blocks to the data buses of the SoC for transmission to memory 204.

Figure 6:
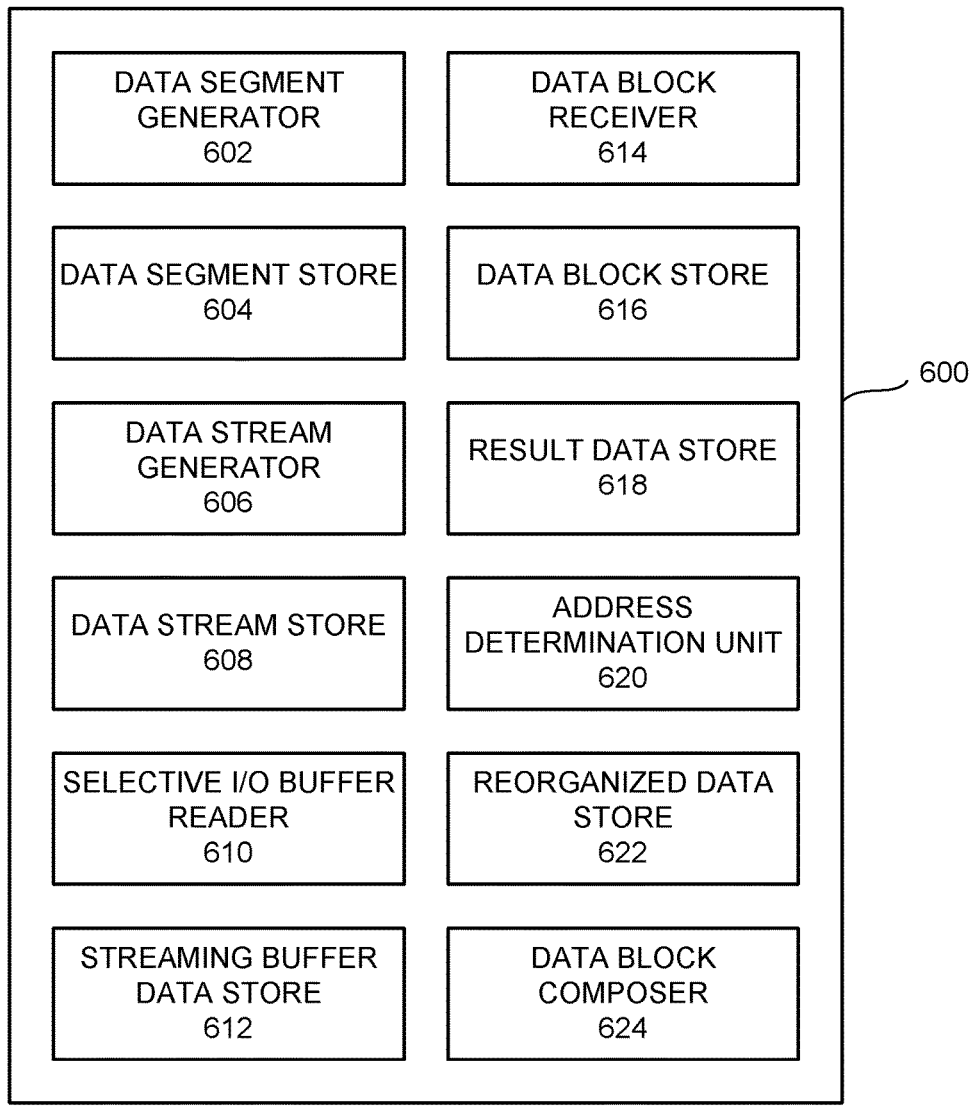
FIG. 6 is a block diagram depicting a system-on-chip including a reconfigurable data interface in accordance with one embodiment.

FIG. 6 depicts a system-on-chip including a reconfigurable data interface for preparing data streams according to execution patterns of a processing unit in a flexible compute accelerate system. SoC 600 includes a data segment generator 602 that is configured to generate from each of a plurality of data blocks a plurality of data segments. In one embodiment, data segment generator 602 includes a field composition circuit. In another example, generator 602 may include a processor and/or software for generating the data segments. The data segment generator may also include one or more buffers for storing the data blocks. Data segment store 604 is configured to store the plurality of data segments for each data block. In one embodiment, the data segment store includes a set of line buffers but other storage means may be used, such as volatile and non-volatile memory or data registers for example. Data stream generator 606 is configured to form a plurality of data streams. Generator 606 may selectively read from the data segment store 604 and combine portions of data segments from multiple data blocks to form the plurality of data streams. Generator 606 may one or more sets of fixed connection circuits including multiplexers and a multiplexor selector. In one embodiment, generator 606 may include a processor, logic and/or software for forming data streams. Data stream store 608 is configured to store the plurality of data streams. In one embodiment, data stream store 608 includes a set of I/O buffers. In another embodiment, data stream store 608 may include other types of memory such as data registers and various volatile or non-volatile memories.

Selective I/O buffer reader 608 is configured to selectively read from the data stream store 608. Reader 608 may read from a set of I/O buffers of the data stream store 608 according to an address indicated by a corresponding address generation unit coupled to the set of I/O buffers. Reader 608 includes one or more sets of address generation units in one embodiment. Reader 608 may include additional logic or other circuitry in one embodiment.

Streaming buffer data store 612 is configured to store data in a set of streaming buffers of a first processing unit based on selectively reading from each I/O buffer. Data store 612 is implemented as part of the processing unit in one embodiment. Data block receiver 614 is configured to receive the plurality of data blocks. Receiver 614 is configured to receive the data blocks at a reconfigurable data interface unit (RDIU) in one embodiment. The data blocks are received over a plurality of data buses in one example. Each data block may have a first data structure and a first bit width. Data block store 616 is configured to store the plurality of data blocks. Data block store 616 may include a set of line buffers for storing the data blocks in one embodiment. Other storage means may be used.

Result data store 618 is configured to store the result data from the first processing unit. The result data store may include a set of line buffers but other storage means may be used. Address determination unit 620 is configured to determine one or more memory address associated with the result data. Unit 620 may include dedicated circuitry such as one or more sets of fixed connection circuits or a processor in one embodiment. Unit 620 may also include software. Reorganized data store 622 is configured to store reorganized data based on the one or more memory addresses of the result data. The reorganized data store may include a set of buffers or other storage means. The data store may also include one or more address generation units. Data block composer 624 is configured to compose the reorganized data into data blocks for transmission on a plurality of data buses. Composer 624 may include one or more fixed composition circuits. In another embodiment, composer 624 may include a processor and/or software.

Accordingly, there has been described an apparatus including a first set of line buffers configured to store a plurality of data blocks from a memory of a system-on-chip and a field composition circuit configured to generate a plurality of data segments from each of the data blocks. The field composition circuit reconfigurable to generate the data segments according to a plurality of reconfiguration schemes. The apparatus includes a second set of line buffers configured to communicate with the field composition circuit to store the plurality of data segments for each data block, and a switching circuit configured to generate from the plurality of data segments a plurality of data streams according to an execution pattern of a processing unit of the system-on-chip.

There has been described a method of data processing by a system-on-chip that includes generating from each of a plurality of data blocks a plurality of data segments, storing the plurality of data segments for each data block in a set of line buffers, selectively reading from the set of line buffers to combine portions of data segments from multiple data blocks to form a plurality of data streams, and storing the plurality of data streams in a set of input/output (I/O) buffers based on a plurality of execution patterns for a processing unit of a system-on-chip (SoC).

There has been described a system that includes a generating element for generating from each of a plurality of data blocks a plurality of data segment, a first storage element for storing the plurality of data segments for each data block in a set of line buffers, a reading element for selectively reading from the set of line buffers to combine portions of data segments from multiple data blocks to form a plurality of data streams, and a second storage element for storing the plurality of data streams in a set of input/output (I/O) buffers based on a plurality of execution patterns for a processing unit of a system-on-chip (SoC).

A system-on-chip has been described that includes one or more memory devices, a plurality of buses coupled to the one or more memory devices, and a plurality of compute systems coupled to the plurality of buses. Each compute system comprises a processing unit configured to receive a plurality of data streams corresponding to a plurality of execution patterns of the processing unit, a controller coupled to the processing unit, and a reconfigurable data interface unit (RDIU) coupled to the processing unit and the plurality of buses. The RDIU is configured to receive a plurality of data blocks from the plurality of buses that are associated with one or more memory addresses, and generate the plurality of data streams by decomposing each of the data blocks into a plurality of data segments and combining data segments from multiple data blocks according to the plurality of execution patterns of the processing unit.

The technology described herein can be implemented using hardware, software, or a combination of both hardware and software. The software can be stored on one or more processor readable storage devices described above (e.g., memory 204, mass storage or portable storage) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media is non-transitory and may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

What is claimed is:

1. An apparatus, comprising:
   a first set of line buffers configured to receive and store, for a first data cycle, a plurality of data blocks from a memory of a system-on-chip (SoC) via at least one data bus, wherein each data block has a first data structure and a first bit width;
   a field composition circuit configured to generate a plurality of data segments from each of the data blocks according to a plurality of reconfiguration schemes, the generating including decomposing each data block of the plurality from the first set of line buffers into the plurality of data segments, and each data segment has a second bit width that is less than the first bit width;

a second set of line buffers configured to communicate with the field composition circuit to store, for a second data cycle following the first data cycle, the plurality of data segments for each data block;

a switching circuit configured to generate from the plurality of data segments a plurality of data streams according to an execution pattern of a processing unit of the SoC;

a set of input/output (I/O) buffers configured to store, for a third data cycle following the second data cycle, the plurality of data streams;

a set of streaming buffers storing data of a first processing unit based on selectively reading from each I/O buffer; and a reconfigurable data interface (RDIU) receiving the plurality of data blocks from a plurality of data buses.

2. The apparatus of claim 1, further comprising:
a set of multiplexers coupled between the second set of line buffers and the set of I/O buffers, each multiplexer including a plurality of inputs coupled to a subset of the second set of line buffers and an output coupled to a corresponding I/O buffer, each multiplexer configured to select an input corresponding to a selected line buffer of the second set according to a reconfigurable MUX selector circuit.

3. The apparatus of claim 2, further comprising:
a first set of address generation units (AGU) coupled to the second set of line buffers, each address generation unit configured to selectively read from an output of a corresponding line buffer of the second set according to an address indicated by the AGU for a corresponding data cycle.

4. The apparatus of claim 3, further comprising:
a second set of AGUs coupled to the set of I/O buffers, each AGU of the second set configured to selectively read from an output of a corresponding I/O buffer according to an address indicated by the AGU for a corresponding data cycle.

5. The apparatus of claim 4, wherein:
each AGU of the second set configured to selectively read from the output of the corresponding I/O buffer according to the execution pattern of the processing unit of the SoC.

6. The apparatus of claim 5, further comprising:
a third set of AGUs coupled to the set of I/O buffers, each AGU of the third set configured to selectively write data to a corresponding I/O buffer according to an address indicated by the AGU for a corresponding data cycle.

7. The apparatus of claim 6, wherein the set of multiplexers is a first set of multiplexers, the apparatus further comprising:
a second set of multiplexers between the second set of line buffers and the set of I/O buffers, each multiplexer of the second set including an input coupled to a subset of the I/O buffers and an output coupled to a corresponding line buffer of the second set, each multiplexer of the second set configured to select an input corresponding to a selected I/O buffer according to the reconfigurable MUX selector circuit.

8. The apparatus of claim 1, wherein:
the execution pattern of the processing unit is a first execution pattern of a plurality of execution patterns of the first processing unit; and
the switching circuit is reconfigurable to generate from the plurality of data segments the plurality of data streams according to the plurality of execution patterns of the processing unit.

9. A method of data processing by a system-on-chip, comprising:
storing a plurality of data blocks in a first set of line buffers for a first data cycle, wherein each data block has a first data structure and a first bit width;
generating from each of the plurality of data blocks a plurality of data segments, the generating including decomposing each data block of the plurality from the first set of line buffers into the plurality of data segments, and each data segment has a second bit width that is less than the first bit width;
storing the plurality of data segments for each data block in a second set of line buffers for a second data cycle following the first data cycle;
selectively reading from the second set of line buffers to combine portions of data segments from multiple data blocks to form a plurality of data streams;
storing the plurality of data streams in a set of input/output (I/O) buffers for a third data cycle following the second data cycle and based on a plurality of execution patterns for a processing unit of a system-on-chip (SoC);
storing data in a set of streaming buffers of a first processing unit based on selectively reading from each I/O buffer; and
receiving at a reconfigurable data interface unit (RDIU) the plurality of data blocks from a plurality of data buses.

10. The method of claim 9, wherein selectively reading from the second set of line buffers comprises:
selectively reading from each second line buffer according to an address indicated by a corresponding address generation unit (AGU) from a first set of AGUs coupled to the second set of line buffers.

11. The method of claim 9, further comprising:
selectively reading from each I/O buffer according to an address indicated by a corresponding AGU from a second set of AGUs coupled to the set of I/O buffers.

12. The method of claim 9, wherein:
selectively reading from each line buffer of the second set includes reading according to a first pattern defined by the first set of AGUs; and
selectively reading from each I/O buffer includes reading according to a second pattern defined by the second set of AGUs.

13. The method of claim 12, further comprising:
storing in the set of I/O buffers result data from the first processing unit;
determining one or more memory addresses associated with the result data;
storing in the second set of line buffers reorganized data based on the one or more memory addresses of the result data; and
composing the reorganized data into data blocks for transmission on the plurality of data buffers.

14. The method of claim 13, wherein:
composing the reorganized data into data blocks includes providing a specific address for each data block.

15. The method of claim 14, wherein:
the data selectively read from the set of I/O buffers according to the second set of AGUs is a data stream in the second pattern that matches over a plurality of data cycles with one or more data paths inside the first processing unit.

16. The method of claim 9, wherein:

the plurality of data streams have a second data structure that is different from the first data structure; and the plurality of data streams have a second bit width that is less than the first bit width.

17. A system-on-chip, comprising:

one or more non-transitory memory devices comprising instructions;

a plurality of buses coupled to the one or more memory devices;

a plurality of compute systems coupled to the plurality of buses, each compute system comprising one or more processing units to execute the instructions to:

store a plurality of data blocks in a first set of line buffers for a first data cycle, wherein each data block has a first data structure and a first bit width;

generate from each of the plurality of data blocks a plurality of data segments, the generating including decomposing each data block of the plurality from the first set of line buffers into the plurality of data segments, and each data segment has a second bit width that is less than the first bit width;

store the plurality of data segments for each data block in a second set of line buffers for a second data cycle following the first data cycle;

selectively read from the second set of line buffers to combine portions of data segments from multiple data blocks to form a plurality of data streams;

store the plurality of data streams in a set of input/output (I/O) buffers for a third data cycle following the second data cycle and based on a plurality of execution patterns for a processing unit of a system-on-chip (SoC);

store data in a set of streaming buffers of a first processing unit based on selectively reading from each I/O buffer; and receive at a reconfigurable data interface unit (RDIU) the plurality of data blocks from a plurality of data buses.

18. The system-on-chip of claim 17, wherein the one or more processing units are unit is a field programmable gate arrays.

19. The system-on-chip of claim 17, wherein selectively reading from the second set of line buffers comprises selectively reading from each second line buffer according to an address indicated by a corresponding address generation unit (AGU) from a first set of AGUs coupled to the second set of line buffers.

20. The system-on-chip of claim 17, wherein the one or more processing units further execute the instructions to selectively reading from each I/O buffer according to an address indicated by a corresponding AGU from a second set of AGUs coupled to the set of I/O buffers.

21. The system-on-chip of claim 17, wherein:

selectively reading from each line buffer of the second set includes reading according to a first pattern defined by the first set of AGUs; and selectively reading from each I/O buffer includes reading according to a second pattern defined by the second set of AGUs.

* * * * *